Patented June 15, 1954

2,681,365

UNITED STATES PATENT OFFICE 2,681,365

N-(3,4-DICHLOROBENZYL)-N-(n-DODECYL)- N,N-DI-(2-HYDROXYETHYL)AMMONIUM CHLORIDE AND PREPARATION THEREOF

Louis L. Hallock, Terre Haute, Ind., assignor to Sterling Drug Inc., New York, N. Y., a corporation of Delaware No Drawing. Application June 2, 1952, Serial No. 291,298

2 Claims. (Cl. 260—567.6)

This invention relates to N-(3,4-dichlorobenzyl)-N-(n-dodecyl)-N,N-di-(2 - hydroxyethyl)-ammonium chloride and to the preparation of the same.

I have discovered that N-(3,4-dichlorobenzyl)-N-(n-dodecyl)-N,N-di-(2-hydroxyethyl)ammonium chloride is highly useful as an antifungal agent and that it also exhibits useful antibacterial properties.

The preparation of my new compound can be carried out conveniently by treating N-(n-dodecyl)diethanolamine with 3,4-dichlorobenzyl chloride. This reaction is represented by the following equation:

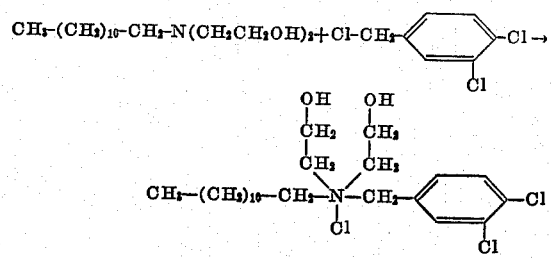

Advantageously, this reaction is carried out by heating approximately equi-molecular proportions of the two reactants together at 40–100° C. If desired, the condensation product thus obtained can be submitted to purification procedures.

My invention is illustrated by the following example without, however, being limited thereto.

Example

A mixture of 55 g. of N-(n-dodecyl)diethanolamine and 39.1 g. of 3,4-dichlorobenzyl chloride was heated under reflux for about twelve hours. The thick colorless reaction product thus obtained was dissolved in ethanol, the solution was filtered, and the ethanol was then removed from the solution by distillation. The residue thus obtained was recrystallized from acetone and dried at 50° C. at 1 mm. to yield 55 g. of N-(3,4-dichlorobenzyl)-N-(n-dodecyl)-N,N-di-(2-hydroxyethyl)ammonium chloride which melted at 95.0–96.5° C. This product was a very hygroscopic, colorless powder which was soluble in water to the extent of 10% (weight/volume). A 1% solution of the compound had pH 7.2.

N-(3,4-dichlorobenzyl)-N-(n-dodecyl-N,N - di-(2-hydroxyethyl)ammonium chloride was found to have high activity against many species of bacteria, for example *Staphylococcus aureus, Clostridium welchii, Mycobacterium tuberculosis, Streptococcus pyogenes, Shigella dysenteriae, Pasteurella pestis, Eberthella typhi*, and *Streptococcus faecalis*, and fungi, for example, *Trichophyton interdigitale, Trichophyton mentagrophytes, Trichophyton gypseum*, and *Monilia albicans*.

I claim:

1. N-(3,4-dichlorobenzyl)-N-(n-dodecyl)-N,N-di-(2-hydroxyethyl)ammonium chloride, having the formula

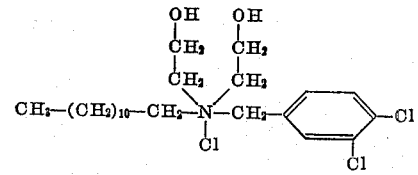

2. The process which comprises interacting N-(n-dodecyl)diethanolamine with 3,4-dichlorobenzyl chloride.

References Cited in the file of this patent

UNITED STATES PATENTS

| Number | Name | Date |
|---|---|---|
| 1,883,042 | Somerville | Oct. 18, 1932 |
| 2,003,960 | Tonkin et al. | June 4, 1935 |
| 2,214,352 | Schoeller et al. | Sept. 10, 1940 |
| 2,302,805 | Schussler | Nov. 24, 1942 |

FOREIGN PATENTS

| Number | Country | Date |
|---|---|---|
| 458,033 | Great Britain | Dec. 8, 1936 |